US011810050B2

(12) United States Patent
Sasidharan et al.

(10) Patent No.: US 11,810,050 B2
(45) Date of Patent: Nov. 7, 2023

(54) ROBOTIC PACKAGE DELIVERY WITH AD-HOC NETWORK FUSION LOCALIZATION

(71) Applicant: Ford Global Technologies, LLC, Dearborn, MI (US)

(72) Inventors: Sandeep Sasidharan, Canton, MI (US); Ling Zhu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 313 days.

(21) Appl. No.: 17/407,466

(22) Filed: Aug. 20, 2021

(65) Prior Publication Data
US 2023/0059161 A1 Feb. 23, 2023

(51) Int. Cl.
*G06Q 10/0832* (2023.01)
*G05D 1/02* (2020.01)
(Continued)

(52) U.S. Cl.
CPC ....... *G06Q 10/0832* (2013.01); *G05D 1/0246* (2013.01); *G05D 1/0274* (2013.01);
(Continued)

(58) Field of Classification Search
CPC ...... G06Q 10/0832; H04W 4/46; H04W 4/44; H04W 84/18; G05D 1/0246; G05D 1/0274; H01Q 1/3208; H01Q 3/24
(Continued)

(56) References Cited

U.S. PATENT DOCUMENTS 6,374,155 B1 4/2002 Wallach et al.
10,129,704 B1 * 11/2018 Huseth .................. H04W 4/80
(Continued)

OTHER PUBLICATIONS

"An Autonomous Delivery Robot to Prevent the Spread of Coronavirus in Product Delivery System" Published by IEEE (Year: 2020).*
(Continued)

*Primary Examiner* — Zeina Elchanti
(74) *Attorney, Agent, or Firm* — Brandon Hicks; Eversheds Sutherland (US) LLP (57) ABSTRACT

A method for computing a quality location estimate of a delivery robot by creating an ad-hoc network that can include one or more autonomous delivery vehicles, nearby infrastructure such as $5^{th}$ Generation signal transceivers, vehicle-to-infrastructure (V2I) enabled autonomous vehicles, and millimeter-wave device components in Line-Of-Sight (LOS) with any of the above communicating devices. The method can include estimating the quality for localization (e.g., dilution of precision), and steering the robot delivery vehicle via a vehicle-to-anything (V2X) antenna disposed on the robot delivery vehicle and/or repositioning the autonomous delivery vehicle itself to obtain maximum positioning accuracy. The location estimates computed by the vehicle are sent to the delivery robot which then fuses these estimates with its onboard sensor values. The method may assist localization based on a 2D occupancy map to enhance the positioning performance and provides robust localization mechanism without expensive 3D sensors.

17 Claims, 5 Drawing Sheets

(51) Int. Cl.
*H01Q 3/24* (2006.01)
*H04W 4/46* (2018.01)
*H04W 84/18* (2009.01)
*H01Q 1/32* (2006.01)
*H04W 4/44* (2018.01)

(52) U.S. Cl.
CPC ............. *H01Q 1/3208* (2013.01); *H01Q 3/24* (2013.01); *H04W 4/44* (2018.02); *H04W 4/46* (2018.02); *H04W 84/18* (2013.01)

(58) Field of Classification Search
USPC ........................................................ 705/332
See application file for complete search history.

(56) References Cited

U.S. PATENT DOCUMENTS

| | | | | |
|---|---|---|---|---|
| 2016/0094598 A1* | 3/2016 | Gedikian | .............. | H04L 65/611 455/456.3 |
| 2016/0343178 A1* | 11/2016 | Lesesky | ........... | G06K 19/07722 |
| 2017/0024789 A1* | 1/2017 | Frehn | ..................... | G06Q 50/12 |
| 2017/0213403 A1 | 7/2017 | Diehl et al. | | |
| 2018/0253107 A1 | 9/2018 | Heinla et al. | | |

OTHER PUBLICATIONS

Liangkai Liu et al, "Computing Systems for Autonomous Driving: State-of-the-Art and Challenges", Department of Computer Science, Wayne State University, Detroit, MI 48202, Nov. 20, 2020, 19 pages.

Z.J. Chong et al, "Autonomous Personal Vehicle for the First-and Last-Mile Transportation Services", Fifth International Conference on Cybernetics and Intelligent Systems (CIS), 2011 IEEE, 8 pages.

Andreja Malus et al, "Real-Time order dispatching for a fleet of autonomous mobile robots using multi-agent reinforcement learning", Elsevier, CIRP Annals—Manufacturing Technology, May 17, 2020, 4 pages.

* cited by examiner

FIG. 5 ously. Door to door delivery using autonomous vehicle (AV) accompanied by delivery robots from curbside to house doors require high precision location estimates for driveway navigation. Such a level of precision is not available by using GPS based techniques and often driveways have poor GPS satellite visibility due to tree cover and building location. Prevalent options include the use of expensive 3D sensors on delivery robots such as 3D-LiDAR, high quality depth camera, etc.

ROBOTIC PACKAGE DELIVERY WITH AD-HOC NETWORK FUSION LOCALIZATION

FIELD

Aspects of the present disclosure are related to robotic delivery vehicle ad-hoc network communication, and more specifically to a robotic package delivery system with ad-hoc network fusion localization.

BACKGROUND

The rise of autonomy and robots in the package delivery business is a growing business trend. The advantage of robotic package delivery is that one can minimize downtime and optimize operational efficiency. Robots can perform delivery at odd hours, such as at night, while humans sleep. Door to door delivery using autonomous vehicle (AV) accompanied by delivery robots from curbside to house doors require high precision location estimates for driveway navigation. Such a level of precision is not available by using GPS based techniques and often driveways have poor GPS satellite visibility due to tree cover and building location. Prevalent options include the use of expensive 3D sensors on delivery robots such as 3D-LiDAR, high quality depth camera, etc.

These sensors are usually expensive, and the solution is simply not scalable. It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present application is generally directed to computing a location estimate of a delivery robot by creating an ad-hoc network that can include one or more autonomous delivery vehicles, nearby infrastructure such as 5th Generation signal transceivers, vehicle-to-infrastructure (V2I) enabled autonomous vehicles, and millimeter-wave device components in Line-Of-Sight (LOS) with any of the above communicating devices. The system estimates the quality for localization (e.g., dilution of precision), and steering the robot delivery vehicle via a vehicle-to-anything (V2X) antenna disposed on the robot delivery vehicle and/or repositioning the autonomous delivery vehicle itself to obtain maximum positioning accuracy. The location estimates computed by the vehicle are sent to the delivery robot which then fuses these estimates with its onboard sensor values. The method may assist localization based on a 2D occupancy map to enhance the positioning performance and provides robust localization mechanism without expensive 3D sensors.

Self-driving delivery platforms may curb the high cost of last-mile and last 100-meter delivery of goods. To improve delivery efficiency, package delivery using robots will be crucial due to low traffic. Disclosed embodiments describe robot navigation and package delivery using an ad-hoc network that can include autonomous delivery vehicles, vehicle-to-anything (V2X)-enabled vehicles in proximity to the delivery robot, and nearby infrastructure such as 5G mobile (or other wireless protocols) device transceivers and the like. Although a delivery robot can include a combination of infrared (IR) cameras, a LiDAR sensory system, and ultrasonic sensors configured and/or programmed to facilitate autonomous operation, it should be appreciated that aspects of the present disclosure provide for robotic delivery vehicle navigation using nearby infrastructure and V2I-enabled vehicles to compensate for unavailable Line-Of-Sight (LOS) between communicating devices and the delivery robot. The delivery robot may utilize 2-Dimensional (2D) map generated using distance data received from the ad-hoc network to navigate pathways between an autonomous delivery vehicle and the package delivery destination, while overcoming limitations known to be associated with non-3D-enabled robotic delivery systems.

Illustrative Embodiments

The disclosure will be described more fully hereinafter with reference to the accompanying drawings, in which example embodiments of the disclosure are shown, and not intended to be limiting.

Figure 1:
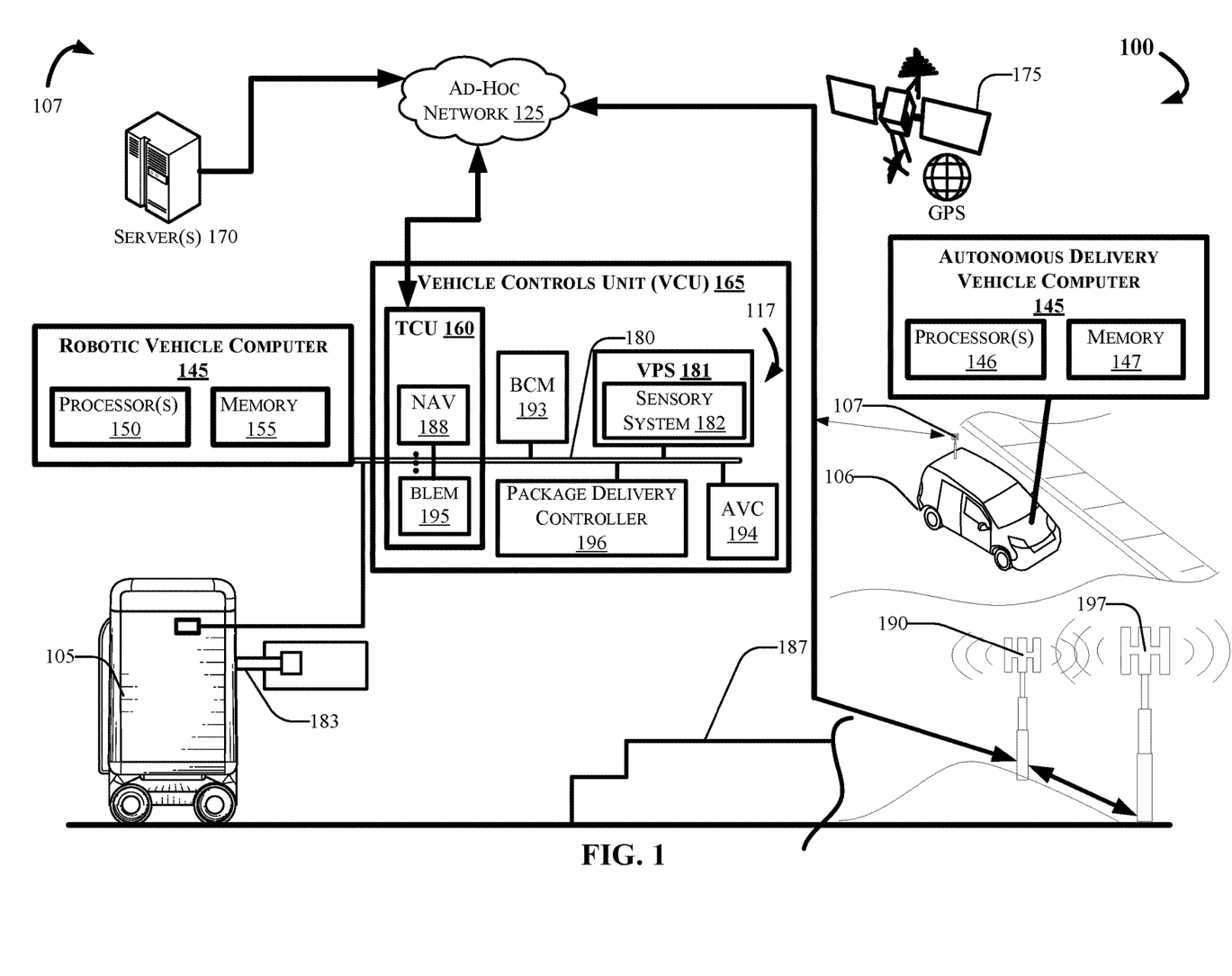
FIG. 1 depicts an example computing environment in which techniques and structures for providing the systems and methods disclosed herein may be implemented.

FIG. 1 depicts an example computing environment 100 that can include a robotic vehicle 105. The delivery robot 105 can include a robotic vehicle computer 145, and a Vehicle Controls Unit (VCU) 165 that typically includes a plurality of electronic control units (ECUs) 117 disposed in communication with the robotic vehicle computer 145, which may communicate via one or more wireless connection(s) 130, and/or may connect with the delivery robot 105 directly using near field communication (NFC) protocols, Bluetooth® protocols, Wi-Fi, Ultra-Wide Band (UWB), and other possible data connection and sharing techniques. The robotic vehicle 105 is configurable to include any robotic chassis, such as bipedal robot, a 4-legged robot, a wheeled robot, etc. The delivery robot 105 may further include robotic arms 183 for loading, unloading, and performing other delivery tasks.

The delivery robot 105 may receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network, or any other type of positioning technology known in the art of wireless navigation assistance.

The delivery robot 105 may further be in communication with one or more infrastructure transmission devices 190 and 197 that can include one or more telecommunications transceivers. For example, such transceivers may include 5$^{th}$ Generation (5G) infrastructure transmission devices and/or the like.

The delivery robot 105 may further be in communication with one or more other robotic devices such as an autonomous delivery vehicle 106 communicating using one or more steerable V2X antenna(s) 107, which may be disposed onboard the vehicle 106 and/or any other V2X-enabled steerable vehicle such as a second delivery robot (not shown in FIG. 1), an autonomous delivery vehicle (such as the steerable antenna 107 as illustrated in FIG. 1), another V2X-enabled vehicle that may be autonomous or semi-autonomous (not shown in FIG. 1), etc. The steerable antenna may be, for example, an autonomous delivery vehicle having an autonomous delivery vehicle computer 146. The autonomous delivery vehicle computer 145 may include one or more processors 146, and a computer-readable memory 147. An example autonomous delivery vehicle 106 is described in greater detail with respect to FIG. 5 hereafter.

According to described embodiments, the steerable antenna 107 may include any type of V2X-enabled vehicle(s) including, a second delivery robot (not shown in FIG. 1) that may be substantially similar to (or identical to) the delivery robot 105. The delivery robot 105 may connect with and/or form an ad-hoc network with two or more of the infrastructure transmission devices 190 and 197, the autonomous delivery vehicle 106, and/or a second V2X-enabled steerable antenna. By generating and/or connecting with an ad-hoc network 125, the delivery robot 105 may compute a quality location estimate in the ad-hoc network 125 using millimeter (mm)-wave deice components in LOS of the delivery robot 105. When LOS is not available from one or more of the connected devices 106, 190 and/or 197 in the ad-hoc network 125, the system 107 may cause the movable antenna 106 to change a location to overcome any LOS loss due to obstructions to a wireless signal transmission.

The robotic vehicle computer 145 may be or include an electronic vehicle controller, having one or more processor(s) 150 and memory 155. The robotic vehicle computer 145 may, in some example embodiments, be disposed in communication with one or more server(s) 170. The server(s) 170 may be part of a cloud-based computing infrastructure, and may be associated with and/or include a Telematics Service Delivery Network (SDN) that provides digital data services to the delivery robot 105 and other vehicles (not shown in FIG. 1) that may be part of a robotic vehicle fleet.

Although illustrated as a four-wheeled delivery robot, the delivery robot 105 may take the form of another robot chassis such as, for example, a two-wheeled vehicle, a multi-wheeled vehicle, a track-driven vehicle, etc., and may be configured and/or programmed to include various types of robotic drive systems and powertrains.

According to embodiments of the present disclosure, the ad-hoc network fused map delivery system 107 may be configured and/or programmed to operate with a vehicle having a Level-1 through Level-4 autonomous vehicle controller (AVC) 194. An example AVC 194 is described in greater detail with respect to FIG. 8. Accordingly, the ad-hoc network fused map delivery system 107 may provide some aspects of human control to the delivery robot 105, when the vehicle is configured as an AV.

The ad-hoc network 125 illustrate an example of communication infrastructure in which the connected devices discussed in various embodiments of this disclosure may communicate. An ad-hoc network is one that is spontaneously formed when devices connect and communicate with each other. The ad-hoc network 125 may be a wireless local area networks (LANs). The devices discussed with respect to FIG. 1 may communicate with each other directly instead of relying on a base station or access points as in wireless LANs for data transfer co-ordination. Each device participates in routing activity, by determining the route using the routing algorithm and forwarding data to other devices via this route. The ad-hoc network 125 may further include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and 5G, to name a few examples.

The robotic vehicle computer 145 may be installed in an interior compartment of the delivery robot 105 (or elsewhere in the delivery robot 105) and operate as a functional part of the ad-hoc network fused map delivery system 107, in accordance with the disclosure. The robotic vehicle computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a package delivery program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The VCU 165 may share a power bus (not shown in FIG. 1) with the robotic vehicle computer 145, and may be configured and/or programmed to coordinate the data between vehicle 105 systems, connected servers (e.g., the server(s) 170), and other vehicles such as a transport and mobile warehouse vehicle (not shown in FIG. 1) operating as part of a vehicle fleet (e.g., one or more other steerable antennas such as the steerable antenna 106, another delivery robot similar to 105, etc.). The VCU 165 can include or communicate with any combination of the ECUs 117, such as, for example, a Body Control Module (BCM) 193, and a package delivery controller 196 configured and/or programmed to control a package delivery mechanism 183. The VCU 165 may further include and/or communicate with a Vehicle Perception System (VPS) 181, having connectivity with and/or control of one or more vehicle sensory system(s) 182.

In some aspects, the VCU 165 may control operational aspects of the delivery robot 105, and implement one or more instruction sets operational as part of the ad-hoc network fused map delivery system 107. The VPS 181 may be disposed in communication with a package delivery controller 196.

Although not necessarily required for practicing embodiments of the present disclosure, the VPS 181 may include a LIDAR device, a sonar device, an IR camera, an RGB camera, an inertial measurement unit (IMU), and/or other sensing devices disposed onboard the vehicle, which may be used by the package delivery controller 196 to sense vehicle location, generate a navigation map (not shown in FIG. 1), and navigate to the destination 187. It should be appreciated that, although described as having the VPS 181, the sensory system may provide navigational sensory data usable for estimating a quality for localization of the delivery robot 105 by fusing distance estimates using data received via the ad-hoc network 125. In this way, expensive sensory equipment such as the LIDAR device(s), sonar device(s), IR camera(s), RGB cameras, IMS(s), etc., may not be needed for robot navigation described herein. Accordingly, the delivery robot 105 may generate the navigation map with or without using a prior high definition map, and may update the map, once created or accessed, with new information encountered during delivery operations.

The TCU 160 can be configured and/or programmed to provide vehicle connectivity to wireless computing systems onboard and offboard the delivery robot 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the delivery robot 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault-tolerant CAN (up to 125 Kbps), which may, in some configurations, use a linear bus configuration. In some aspects, the ECUs 117 may communicate with a host computer (e.g., the robotic vehicle computer 145, the ad-hoc network fused map delivery system 107, and/or the server(s) 170, etc.). The bus 180 may connect the ECUs 117 with the robotic vehicle computer 145 such that the robotic vehicle computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1). The BCM 193 may further include robot power management circuitry that can control power distribution from a power supply (not shown in FIG. 1) to vehicle 105 components.

The BCM 193 may coordinate any one or more functions from a wide range of vehicle functionality, including energy management systems, alarms, vehicle immobilizers, driver and rider access authorization systems, and other functionality. In other aspects, the BCM 193 may control auxiliary equipment functionality, and/or be responsible for integration of such functionality.

The computing system architecture of the robotic vehicle computer 145, VCU 165, and/or the ad-hoc network fused map delivery system 107 may omit certain computing modules. It should be readily understood that the computing environment depicted in FIG. 1 is an example of a possible implementation according to the present disclosure, and thus, it should not be considered limiting or exclusive.

The sensory systems 182 may provide the sensory data obtained from the sensory system 182 responsive to an internal sensor request message. The sensory data may include information from various sensors where the sensor request message can include the sensor modality with which the respective sensor system(s) are to obtain the sensory data.

The sensory system 182 may include one or more camera sensor(s) (not shown in FIG. 1), which may include thermal cameras, optical cameras, and/or a hybrid camera having optical, thermal, or other sensing capabilities. Thermal and/or infrared (IR) cameras may provide thermal information of objects within a frame of view of the camera(s), including, for example, a heat map figure of a subject in the camera frame. An optical camera may provide RGB and/or black-and-white image data of the target(s) and/or the robot operating environment within the camera frame. The camera sensor(s) may further include static imaging, or provide a series of sampled data (e.g., a camera feed).

The sensory system 182 may further include an inertial measurement unit IMU (not shown in FIG. 1), which may include a gyroscope, an accelerometer, a magnetometer, or other inertial measurement device.

The sensory system 182 may further include one or more lighting systems such as, for example, a flash light source (not shown in FIG. 1), and the camera system (not shown in FIG. 1). The flash light source may include a flash device, similar to those used in photography for producing a flash of artificial light (typically ⅟1000 to ½00 of a second) at a color temperature of about 5500 K to illuminate a scene, and/or capture quickly moving objects or change the quality of light in the operating environment 100. Flash refers either to the flash of light itself or to the electronic flash unit (e.g., the flash light source) discharging the light. Flash units are commonly built directly into a camera. Some cameras allow separate flash units to be mounted via a standardized "accessory mount" bracket (a hot shoe).

The sensory system 182 may further include a high beam light source (not shown in FIG. 1), having a broad-beamed, high-intensity (e.g., 75-100 lumens/Watt) artificial light. Where the flash light source may be configured for a single, short-duration flash of light, the high beam light source may be configured to produce a continuous supply of high-intensity light that lights the operating environment 100.

The package delivery controller 196 may include program code and hardware configured and/or programmed for obtaining images and video feed via the VPS 181, and performing semantic segmentation using IR thermal signatures, RGB images, and combinations of RGB and IR thermal imaging obtained from the sensory system 182. Although depicted as a separate component with respect to the robot vehicle computer 145, it should be appreciated that any one or more of the ECUs 117 may be integrated with and/or include the robot vehicle computer 145.

Figure 2:
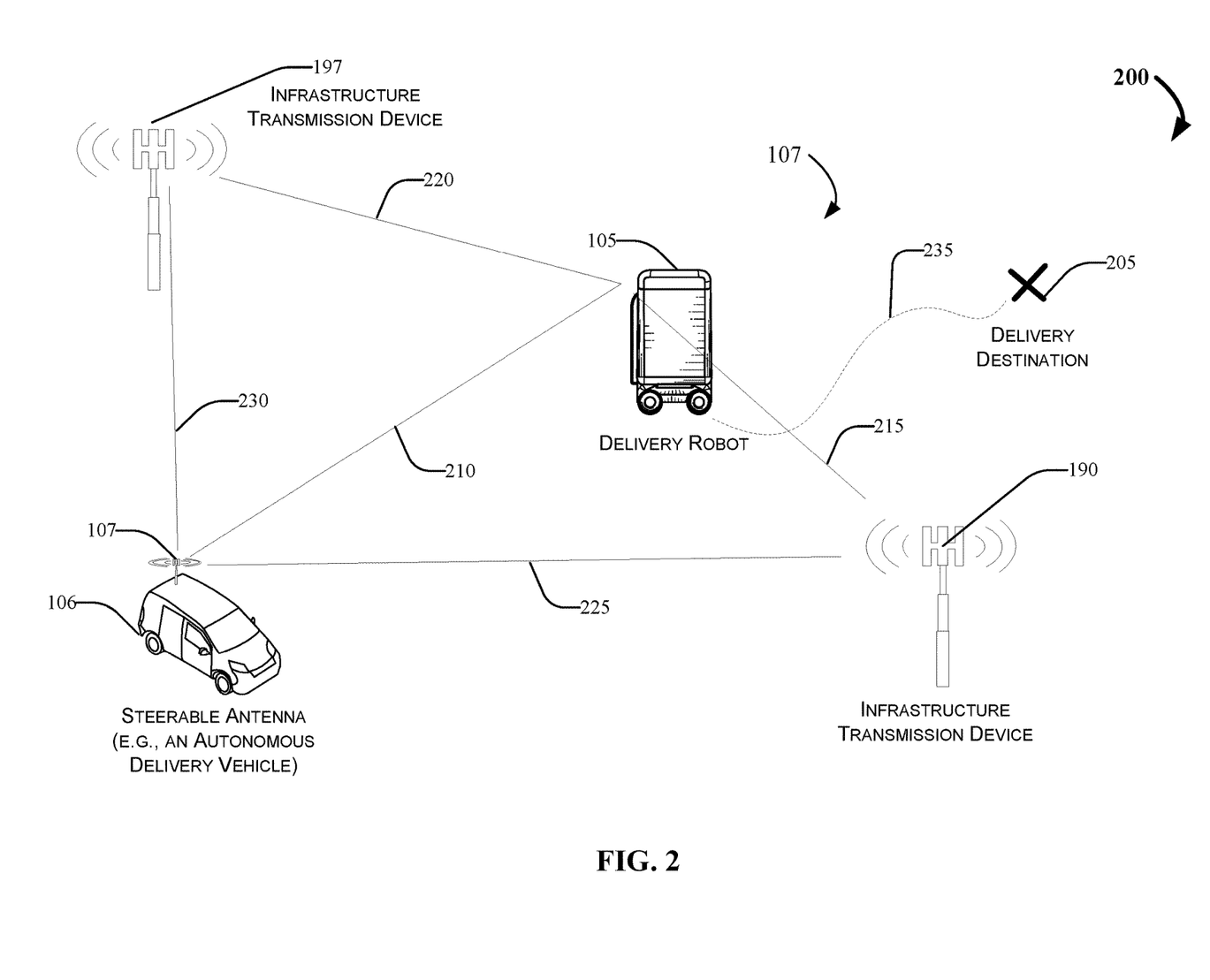
FIG. 2 depicts an example package delivery to a destination using a delivery robot as part of an ad-hoc network in accordance with the present disclosure.

FIG. 2 depicts package delivery to a delivery destination 205 using the delivery robot 105 via autonomous robotic control and navigation using two or more of the infrastructure transmission devices 190 and 198 and the steerable antenna 106 operable as part of an ad-hoc network 200, in accordance with the present disclosure. FIG. 2 is considered with continued reference to elements depicted in FIG. 1.

Figure 3:
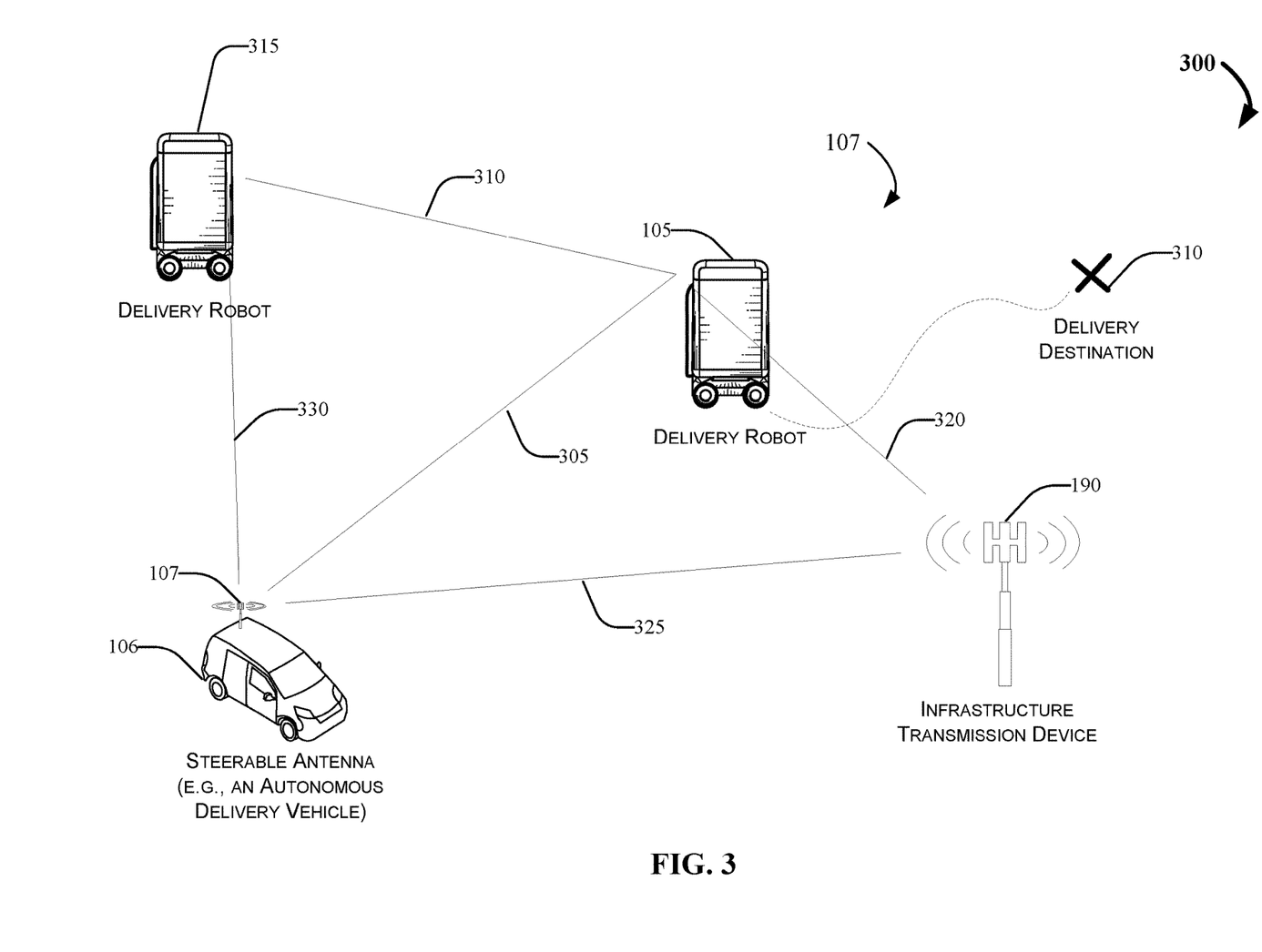
FIG. 3 depicts another example package delivery to a destination using a delivery robot as part of an ad-hoc network in accordance with the present disclosure.
Figure 4:
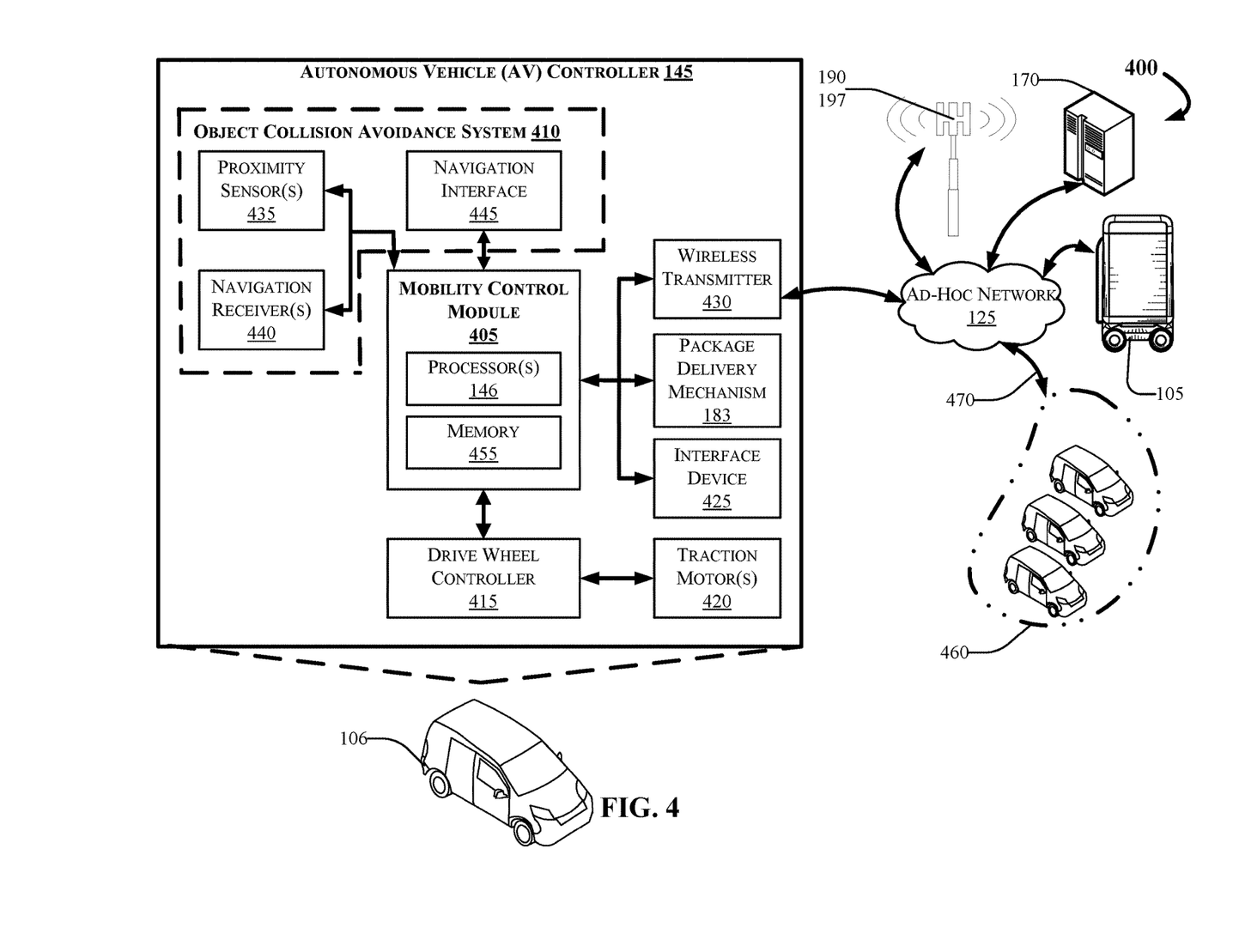
FIG. 4 depicts a block diagram of an example control system for an autonomous delivery vehicle in accordance with the present disclosure.
Figure 5:
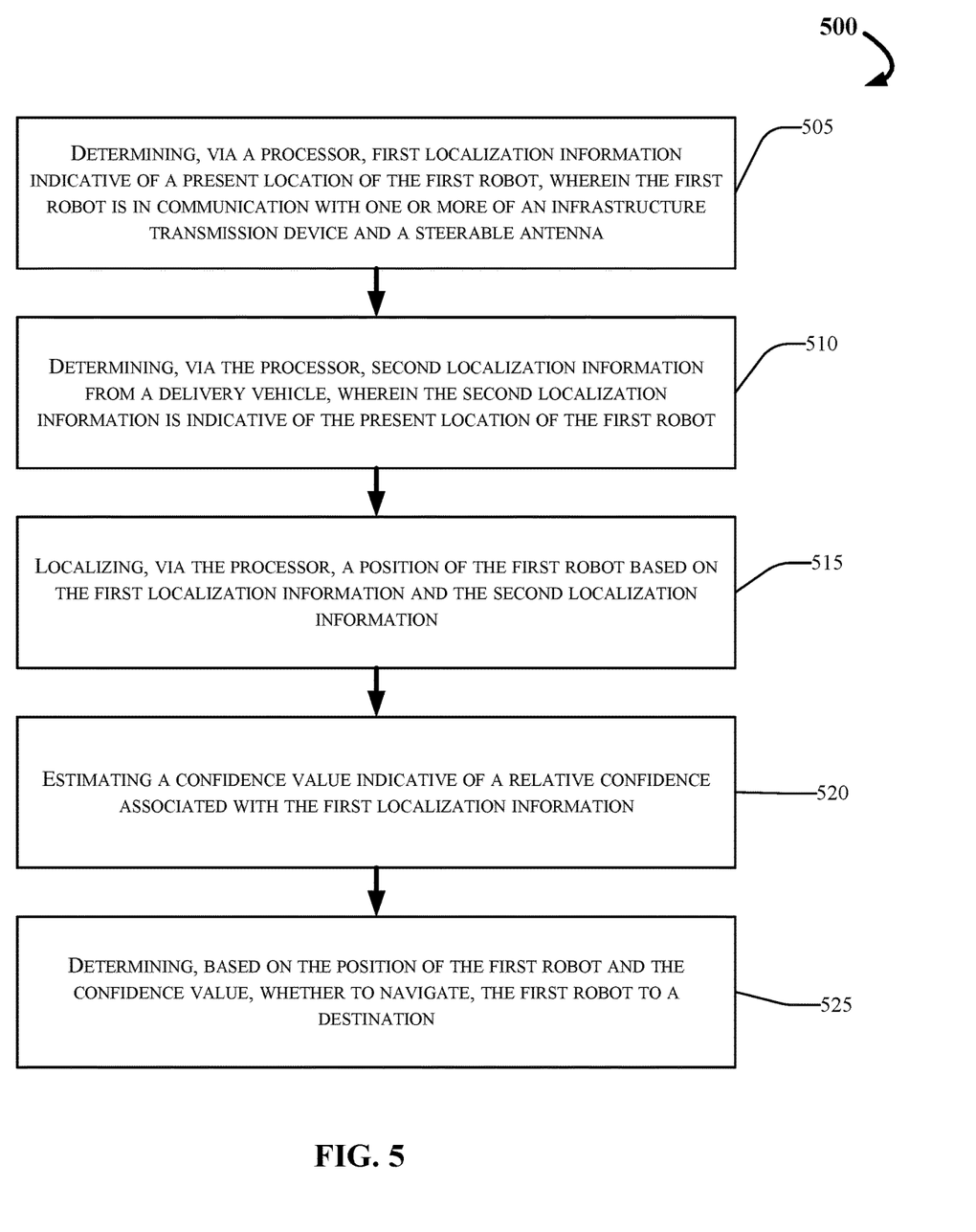
FIG. 5 is a flow diagram of an example method for controlling a delivery robot, according to the present disclosure.

The ad-hoc network fused map delivery system 107 may be configured and/or programmed as a framework for robot operations for package delivery. The sensors and computation onboard vehicle 105 processes environmental data and navigates on sidewalks and other paths at daytime, nighttime, etc., and in varying light and LOS conditions between any of the ad-hoc network 200 elements. Although not depicted as a separate element as shown in FIGS. 1 and 5, the ad-hoc network 125 is illustrated in FIGS. 2-4 where the devices in the ad-hoc network 125 connect directly with one another.

The ad-hoc network fused map delivery system 107 may operate independently using the AVC 194 (described in greater detail with respect to FIG. 8 hereafter) in communication with the AVC 145 disposed onboard one or more steerable antenna(s) (e.g., the steerable antenna 106) via the ad-hoc network 125.

An ad-hoc network 200 may include a connection 210 between the delivery robot 105 to a second steerable antenna 106, a direct connection 215 between the delivery robot 105 and a first infrastructure transmission device 190, and a direct connection 220 between the delivery robot 105 and a second infrastructure transmission device 197. In other aspects, the connected devices in the ad-hoc network 200 may further include direct connections between the non-delivery robot vehicles such as a connection 225 between the steerable antenna 106 and the first infrastructure transmission device 190, and a connection 230 between the steerable antenna 106 and the second infrastructure transmission device 197. Accordingly, using any two of the connected non-delivery robot vehicles and/or infrastructure transmission devices 105, 190, and 197, the delivery robot 105 may maintain LOS communication in the event that an obstruction prevents one or more of the communicating devices from maintaining that LOS.

The accuracy of the 5G localization depends on the quality of the signal in Line of Sight (LOS) between the delivery robot 105 and the other connected infrastructure transmission and V2X-enabled devices. This can be a challenging, as AVs communicate with multiple robots at the same time. To ensure the accuracy of the 5G localization, the system 107 may maximize the LOS communication signal strength using a local search method.

In one example embodiment, the system 107 may utilize a weighted gradient-based optimization method to determine an optimal location of the steerable antenna 106 (e.g., an autonomous delivery vehicle) by determining a precise location of the delivery robot with respect to the delivery destination 205 using signal strength. In one example embodiment, the system 107 may utilize connections 215 and 220 to triangulate the position of the delivery robot 105. For example, as the delivery robot 105 travels to the delivery destination 205, if an obstruction (not shown in FIG. 2) prevents LOS between the first infrastructure transmission device 190 and the delivery robot 105 such that the connection 215 no longer connects those devices, the delivery robot 105 may connect with the second infrastructure transmission device 197 and the steerable antenna 106 to triangulate the precise location and optimal steering angle for the steerable antenna 106 to establish or reestablish LOS for the connection 210.

In another example embodiment, the system 107 may utilize one or more steerable antennas 106. Using the detected signal strength measurement(s), the system 107 may determine a pathway 235 for traveling to the delivery destination 205, and an optimal steering angle for each steerable antenna(s) (e.g., the steerable antenna 106) in cases where direct LOS is not established for a given connection between the steerable antenna 106 and the delivery robot 105.

In this second example embodiment, the detected signal strength for the connection 210 may be represented mathematically in the following form, where $$Fj(X,Y,A), \text{ where} \quad (1)$$

Fj is signal strength observed between the steerable antenna 106 from a given connection 210 and the robot j (e.g., the delivery robot 105), and X and Y are GPS coordinates for the steerable antenna 106.

The system 107 may determine an optimal steering angle for the steerable antenna 106 to maintain LOS in the case that LOS for the connection 210 is lost or still to be established, according to the following expression:

$$A: \forall i, ai, i=[1,M], \text{where} \quad (2)$$

$A:\forall i$ is the optimal steering angle of the steerable antenna M, and 1 indicates a number of steerable antennas currently available. In the example of FIG. 2, there is one steerable antenna 106 shown. The system 107 may determine if a current state [X, Y, A] generated by the signal 210 satisfies $\forall j$, Fj (X, Y, A). If the signal strength Fj is below a certain threshold, it indicates the system need to re-steer the antenna to improve the signal strength. Next, system 107 of robot j starts to find the optimal steering angle A to maximize the signal strength. Responsive to determining that the expression is not satisfied, the system may cause to generate a signal from the delivery robot 105 to the steerable antenna 106 to change position of the steerable antenna 106 (e.g., by moving forward or backward several feet ($\Delta x$ and $\Delta y$, respectively) until LOS is established and the current state [X, Y, A] does satisfy ∀j, Fj (X, Y, A).

For example, the system 107 may calculate gradients and find a new solution by iteratively running the expression below until the solution is converged (no further improvement), $$[X\text{new}\_Y\text{new}\_i, A\text{new}\_i] = [Xi, Yi, Ai] + \alpha * \Sigma^N wj * \nabla fj, \text{ where} \quad (3)$$

for robot i, X, Y, a are current location of robot and antenna steering angle. Xnew, Ynew, Anew is the new robot location and new the steering angle of the antenna, α is learning rate of gradient descent method, ∇fj is gradient of fj which is the signal strength function of robot j, wj is the weight for robot j. After iteratively running the expression, the optimal solution can be found once the solution is converged, which is there is no further big improvement in the signal strength. Next robot i moves to new a position $$X\text{new}, Y\text{new}, \quad (4)$$

by setting the current steerable antenna 106 state to, $$[X, Y, A] \square [X\text{new}, Y\text{new}, A\text{new}] \quad (5).$$

Accordingly, the system 107 may determine first localization information indicative of a present location of the delivery robot 105 in communication with the infrastructure transmission device 190 and the steerable antenna 106, combine the localization information from both direct connections, and use the combined or fused localization information to estimate a confidence value indicative of a relative confidence associated with the fused localization. For example, a predetermined confidence threshold may be associated with the combined signal strength metrics, where a stronger signal strength observed in the combined or fused triangulation may be associated with a relatively higher confidence value. The system 107 may navigate the delivery robot 105 to the destination based on the robot position and the confidence value.

The combining step may include generating a 2-Dimensional (2D) occupancy map not shown in FIG. 2), and navigating to the destination via the 2D occupancy map. Generating the 2D occupancy map may include processing 3D map used by autonomous vehicle. Autonomous vehicle requires 3D map to localize itself, and it is already available, and 2D map can be generated from compressing certain range of height from 3D map. Once the 2D occupancy map is generated from 3D map, robot uses its 2D safety LiDAR (much lower cost compared to 3D LiDAR) to localize itself in the 2D map. Robot utilizes the scan from its 2D safety LiDAR and match it with 2D occupancy map to run the localization. The most widely used method is called adaptive monte carlo localization (AMCL).

FIG. 2 depicts an example for maintaining or establishing LOS in a single steerable antenna scenario. FIG. 3 illustrates maintaining LOS for an ad-hoc network 300 having two steerable antennas 106 and 305, in accordance with embodiments. For example, FIG. 3 illustrates an example for the expression, $$A: \forall i, ai, i = [2, M], \text{where} \quad (5)$$

the numeral 2 in equation (5) above indicates the presence and use of two steerable antennas 106 and 305.

In one aspect, the ad-hoc network 300 is illustrated having a direct connection 305 between the delivery robot 105 to the first steerable antenna 106, a direct connection 310 between the delivery robot 105 and a second steerable antenna 315, a connection 320 between the delivery robot 105 and an infrastructure transmission device 190. Similar to the embodiment of FIG. 2, the system 107 may use any two of the connected devices including the infrastructure transmission device 106, and/or the steerable antennas 106 and 315 to may maintain LOS communication in the event that an obstruction prevents one or more of the communicating devices from maintaining that LOS.

The system 107 may also utilize a connection 325 between the steerable antenna 106 and the infrastructure transmission device 190, and/or a connection 330 between the steerable antenna 106 and the delivery robot 105 to compute the relative position of the robot using any ad-hoc cooperative positioning or 5G triangulation techniques leveraging the information such as beam angles, range, operating frequency etc. This information may be further used to improve the location fusion algorithm 500.

FIG. 4 depicts a block diagram of an example AV controller (AVC) 145, in accordance with embodiments. The AVC 145 may include an object collision avoidance system 410 disposed in communication with a mobility control module 405. The object collision avoidance system 410 may perform object detection, navigation, and provide navigational interactive control features. The mobility control module 405 may be configured and/or programmed to receive data from the object collision avoidance system 410 to provide vehicle control.

The AVC 145 may be disposed in communication with and/or include the ad-hoc network fused map delivery system 107 (not shown in FIG. 4), in accordance with embodiments described herein. The mobility control module 405 may include one or more processor(s) 146, and a memory 147. The processor(s) 146 may be one or more commercially available general-purpose processor(s), such as a processor from the Intel® or ARM® architecture families. In some aspects, the mobility control module 405 may be implemented in a system on a chip (SoC) configuration, to include other system components such as RAM, flash storage and I/O buses. Alternatively, mobility control module 405 can be implemented using purpose-built integrated circuits, or any other suitable technology now known or later developed.

The memory 147 may include executable instructions implementing the basic functionality of the AVC 145 and a database of locations in a geographic area. For example, the mobility control module 405 may connect with a drive wheel controller 415. The drive wheel controller 415 may communicate signals to one or more traction motor(s) 420, which may embody a drive mechanism such as a brushless direct current (DC) motor, or another traction motor technology. The mobility control module 405 may cause the drive wheel controller 415 to transmit motive signals to the traction motor(s) 420 of the steerable antenna 106.

The AVC 145 may further include an interface device 425 having input and output surfaces (not shown in FIG. 4) for providing interactive access to users onboard the AV (e.g., the steerable antenna 106). For example, the interface device 425 may include a touch screen interface surface configured and/or programmed to provide operational information such as power consumption information, battery health, battery level, etc. In some embodiments, the interface device 425 may further provide control features for controlling other motive aspects of the steerable antenna 106, such as braking, acceleration, etc.

The steerable antenna 106 may be further configured and/or programmed to communicate information with other devices and vehicles using a wireless transmitter 430. The wireless transmitter 430 may communicate with one or more other vehicles in the delivery vehicle fleet 460, and/or a central routing computer (e.g., the server(s) 170 as described with respect to FIG. 1) using a wireless communication network such as, for example, the ad-hoc network 125 as shown in FIG. 1. The ad-hoc network 125 may be the Internet, a private network, a cellular telephone provider's data network, or other network infrastructure such as, for example, a vehicle-to-vehicle communication network. An example of a vehicle-to-vehicle communication protocol may be, for example, a dedicated short-range communication (DSRC) protocol for sharing information between delivery robots, and/or between the delivery robot 105 and one or more other vehicles in a delivery vehicle fleet 460.

The steerable antenna 106 may communicate with one or more other vehicles in the delivery vehicle fleet 460 in various ways, including via an indirect communication channel 470 using the ad-hoc network 125, and/or via any number of direct communication channels associated with the ad-hoc network 125.

The object collision avoidance system 410 may include one or more proximity sensor(s) 435, one or more navigation receiver(s) 440, and a navigation interface 445.

The object collision avoidance system 410 may provide route management and communication between one or more other vehicles in the delivery vehicle fleet 460, and to the human operator 169 (not shown in FIG. 4) the steerable antenna 106 when disposed in remote control mode. The mobility control module 405 may receive navigational data from the navigation receiver(s) 440 and the proximity sensor(s) 435, determine a navigational path from a first location to a second location, and provide instructions to the drive wheel controller 415 for autonomous, semi-autonomous, and/or manual operation.

The navigation receiver(s) 440 can include one or more of a global positioning system (GPS) receiver, and/or other related satellite navigation systems such as the global navigation satellite system (GLNSS), Galileo, or other similar systems known in the art of autonomous vehicle operation. Additionally, the navigation receiver(s) 440 can be configured and/or programmed to receive locally based navigation cues to aid in precise navigation through space-restricted areas, such as, for example, in a crowded street, and/or in a distributed beacon environment. When deployed in conjunction with a distributed beacon network (not shown in FIG. 4), locally based navigation cues can include communication with one or more purpose-built location beacons (not shown in FIG. 4) placed throughout a geographic area. The navigation cues may enable an increased level of navigation precision and provide specific indicators for locations of various points of interest. In other aspects, the navigation receiver(s) 440 may include one or more navigation transceivers (not shown in FIG. 4) for communication with mobile network infrastructure for cell tower triangulation and use of known-location Wi-Fi hotspots. Any location technology now known or later developed that can provide a high precision location (e.g. preferably within a linear foot) can be useful as part of navigation receiver(s) 840.

The proximity sensor(s) 435 may work in connection with the navigation receiver(s) 840 to provide situational awareness to the mobility control module 405 for autonomous navigation. For example, the proximity sensors may include one or more Radio Detection and Ranging (RADAR or "radar") sensors configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The proximity sensor(s) 435 may alert the mobility control module 405 to the presence of sensed obstacles, and provide trajectory information to the mobility control module 405, where the trajectory information is indicative of moving objects or people that may interact with the delivery robot 105. The trajectory information may include one or more of a relative distance, a trajectory, a speed, a size approximation, a weight approximation, and/or other information that may indicate physical characteristics of a physical object or person.

The mobility control module 405 may be configured and/or programmed to aggregate information from navigation receiver(s) 440, such as current position and speed, along with sensed obstacles from the proximity sensor(s) 435, and interpret the aggregated information to compute a safe path towards a destination such that the steerable antenna 106 avoids collisions. Sensed obstacles can include other vehicles, pedestrians, animals, structures, curbs, and other random objects. In some implementations the proximity.

FIG. 5 is a flow diagram of an example method 500 for method for controlling a delivery robot, according to the present disclosure. FIG. 5 may be described with continued reference to prior figures, including FIGS. 1-4. The following process is exemplary and not confined to the steps described hereafter. Moreover, alternative embodiments may include more or less steps that are shown or described herein, and may include these steps in a different order than the order described in the following example embodiments.

Referring first to FIG. 5, at step 505, the method 500 may commence with determining, via a processor, first localization information indicative of a present location of the first robot, wherein the first robot is in communication with one or more of an infrastructure transmission device and a steerable antenna. In one aspect, the steerable antenna can include an autonomous delivery vehicle, and a second robot.

At step 510, the method 500 may further include determining, via the processor, second localization information from a delivery vehicle, wherein the second localization information is indicative of the present location of the first robot. This step may include receiving a first signal from a first 5th Generation (5G) infrastructure transmission device, and receiving a second signal from a second 5G infrastructure transmission device.

At step 520, the method 500 may further include estimating a confidence value indicative of a relative confidence associated with the first localization information. This step may include creating, via the processor and based on the first localization, the second localization, and the confidence value, a 2-Dimensional (2D) occupancy map, and navigating to the destination via the 2D occupancy map.

At step 525, the method 500 may further include determining, based on the position of the first robot and the confidence value, whether to navigate, the first robot to a destination. This step may include navigating the first robot to the destination responsive to determining that the confidence value meets or exceeds a threshold value.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application-specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a first robot, comprising:
   determining, via a processor, first localization information indicative of a present location of the first robot, wherein the first robot is in communication with one or more of an infrastructure transmission device and a steerable antenna;
   receiving, via the processor, second localization information from a delivery vehicle, wherein the second localization information is indicative of the present location of the first robot;
   localizing, via the processor, a position of the first robot based on the first localization information and the second localization information;
   estimating a confidence value indicative of a relative confidence associated with the location of the first robot;
   determining, based on the position of the first robot and the confidence value, whether to navigate, the first robot to a destination; and
   navigating the first robot to the destination responsive to determining that the confidence value meets or exceeds a threshold value.

2. The method according to claim 1, further comprising:
   creating, via the processor and based on the first localization, the second localization, and the confidence value, a 2-Dimensional (2D) occupancy map; and
   navigating to the destination via the 2D occupancy map.

3. The method according to claim 1, wherein determining the first localization information comprises:
   receiving a first signal from a first infrastructure transmission device; and
   receiving a second signal from a second infrastructure transmission device.

4. The method according to claim 1, wherein determining the first localization information comprises one infrastructure transmission device and one autonomous delivery vehicle.

5. The method according to claim 1, wherein the steerable antenna comprises an autonomous delivery vehicle and a second robot.

6. The method according to claim 1, wherein the steerable antenna comprises a second robot.

7. The method according to claim 1, wherein the steerable antenna lacks line of sight to the first robot.

8. The method according to claim 1, wherein the infrastructure transmission device lacks line of sight to the first robot.

9. A robot delivery system, comprising:
   a processor; and
   a memory for storing executable instructions, the processor programmed to execute the instructions to:
   determine first localization information indicative of a present location of a first robot, wherein the first robot is in communication with one or more of an infrastructure transmission device and a second robot;

receiving second localization information from a delivery vehicle, wherein the second localization information is indicative of the present location of the first robot;

localize a position of the first robot based on the first localization information and the second localization information;

estimate a confidence value indicative of a relative confidence associated with the location of the first robot;

determine, based on the position of the first robot and the confidence value, whether to navigate the first robot to a destination; and navigate the first robot to the destination responsive to determining that the confidence value meets or exceeds a threshold value.

10. The system according to claim 9, wherein the processor is further programmed to:

create, based on the first localization, the second localization, and the confidence value, a 2-Dimensional (2D) occupancy map; and navigate to the destination via the 2D occupancy map.

11. The system according to claim 9, wherein the processor is further programmed to:

determine the first localization information using a first signal from a first infrastructure transmission device and a second signal from a second infrastructure transmission device.

12. The system according to claim 9, wherein the second robot is an autonomous vehicle, and the processor is further programmed to:

determine the first localization information using a first signal from the infrastructure transmission device and a second signal from the second robot.

13. The system according to claim 9 wherein the second robot comprises an autonomous delivery vehicle, wherein the processor is further programmed to:

determine the first localization information using a first signal from the autonomous delivery vehicle and a second signal from the second robot.

14. The system according to claim 9, wherein the processor is further programmed to:

detect a doorway at the destination, wherein detecting the doorway comprises:

take a first door locating flash image at a first camera orientation;

take a second door locating flash image at a second camera orientation; and perform semantic segmentation on the first door locating flash image and the second door locating flash image.

15. The system according to claim 9, wherein the infrastructure transmission device lacks line of sight to the first robot.

16. A non-transitory computer-readable storage medium comprising instructions that, when executed by a processor, cause the processor to execute the instructions to:

determine first localization information indicative of a present location of a first robot, wherein the first robot is in communication with one or more of a infrastructure transmission device and a steerable antenna;

receive second localization information from a delivery vehicle, wherein the second localization information is indicative of the present location of the first robot;

determine a localization of the first robot based on the first localization information and the second localization information;

estimate a confidence value indicative of a relative confidence associated with the first localization information;

determine, based on the position of the first robot and the confidence value, whether to navigate the first robot to a destination; and navigate the first robot to the destination responsive to determining that the confidence value meets or exceeds a threshold value.

17. The non-transitory computer-readable storage medium of claim 16, wherein the processor is further programmed to:

create, based on the first localization, the second localization, and the confidence value, a 2-Dimensional (2D) occupancy map; and navigate to the destination via the 2D occupancy map.

* * * * *